July 3, 1962        E. KESZLER        3,041,731
INSIDE VERNIER MEASURING DEVICE
Filed April 12, 1960        2 Sheets-Sheet 2
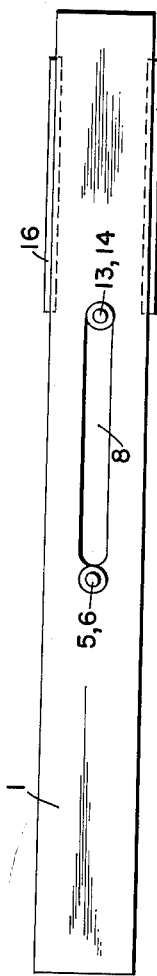
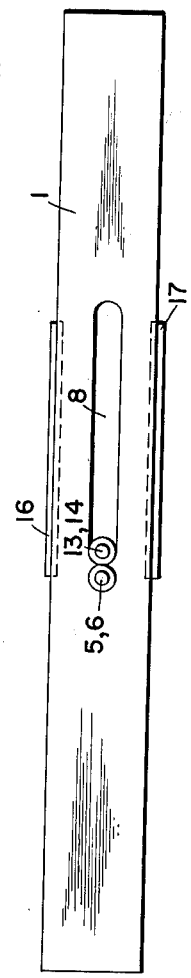
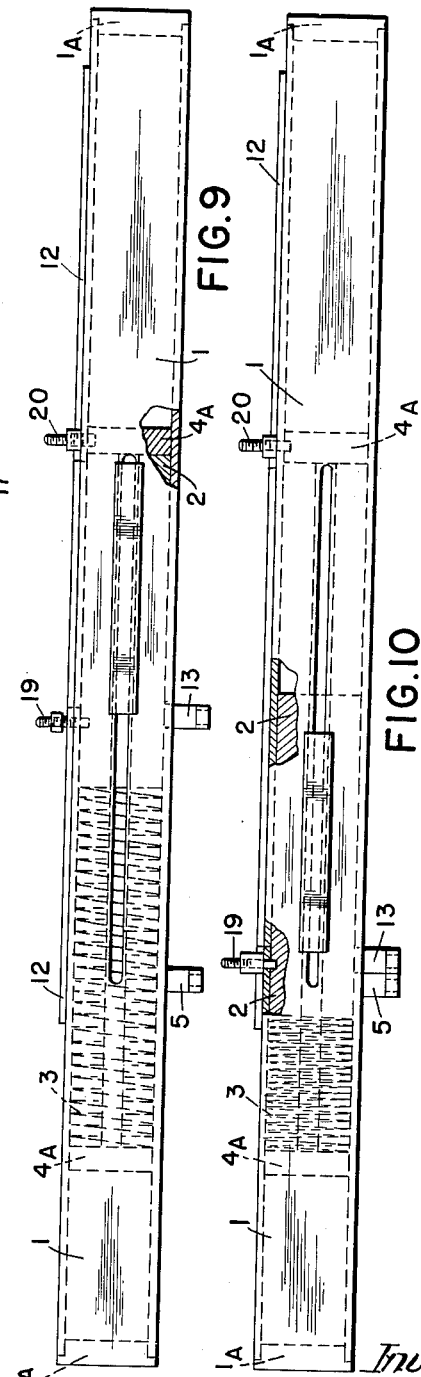
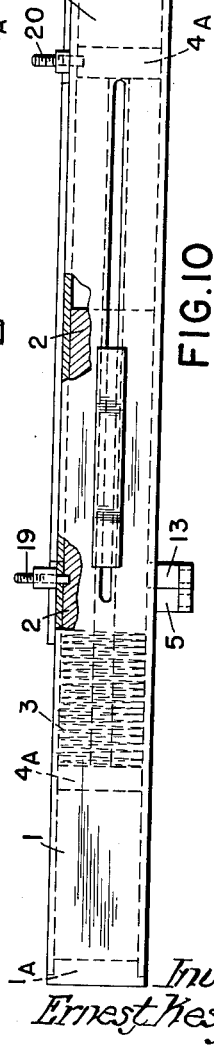
Inventor
Ernest Keszler

United States Patent Office 3,041,731
Patented July 3, 1962

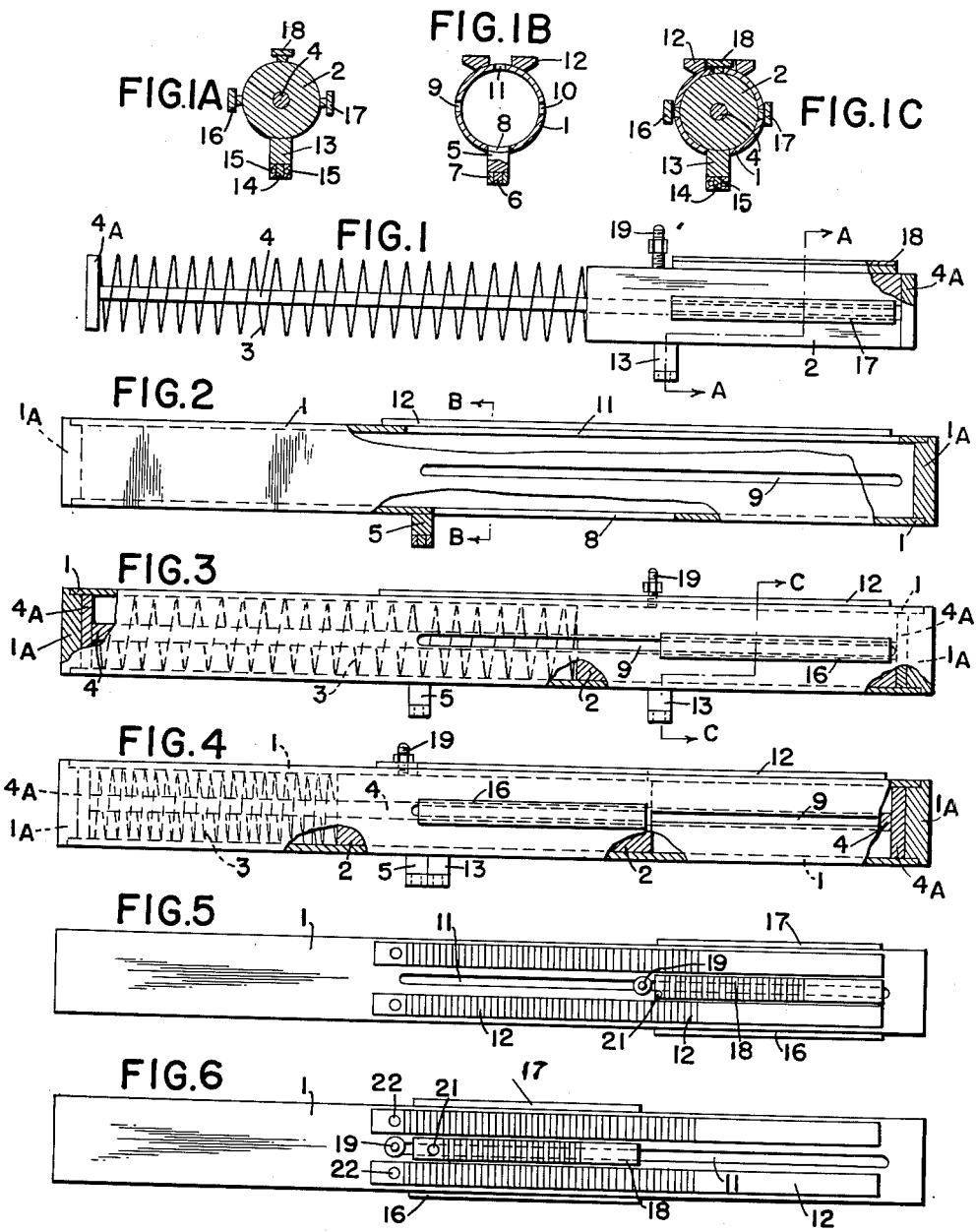

3,041,731
INSIDE VERNIER MEASURING DEVICE
Ernest Keszler, 3525 Broadway, Chicago, Ill.
Filed Apr. 12, 1960, Ser. No. 21,774
8 Claims. (Cl. 33—143)

Precision measurement of the size of round, oval and elongated holes can only be taken in such a way that the measuring is to occur on the two oppositely located points of the hole and these points should be so chosen that the imaginary straight line between these two points cuts the center of the hole. When using the presently known calipers for the measurement of the size of holes, to assure precise and accurate measurement it is absolutely necessary to take into consideration the following: while searching for the measuring points, friction occurs between the edge of the hole and the measuring glides of the caliper. Since the surface of the edge of the hole is in most cases rough or burred, especially if the holes were made by a punch press, the friction varies. Furthermore, it is also known that in order to determine measurements precisely it is important that the pressure effected on the edge of the hole during the measuring process, should be uniform at all times. Since the known vernier calipers cannot mechnically control the above mentioned factors that influence the precise measurement, the operator has to make up for the inadequacies of the measuring calipers. Consequently, only experienced persons who have the necessary skill and feeling are qualified for the precision measuring of these measurements, but even in that case, the precise determination of measurements can only be done with great waste of time.

The new vernier measuring device described below and illustrated in the enclosed drawings is designed to eliminate the guesswork and no special skill is required to operate it. The internal measurements of holes and slots varying in sizes and forms can be obtained easily, quickly and accurately with this new measuring device.

The accompanying drawings illustrate the above mentioned new measuring device.

FIG. 1 illustrates the inside unit of the measuring device.

FIG. 1A illustrates the cross section of FIG. 1 at A—A.

FIG. 2 illustrates the outside unit of the measuring device.

FIG. 1B illustrates the cross section of FIG. 2 at B—B.

FIG. 3 is the front view of the measuring device in free state.

FIG. 1C illustrates the cross section of FIG. 3 at C—C.

FIG. 4 is the front view of the measuring device in working position.

FIG. 5 is the top view of the measuring device in free state.

FIG. 6 is the top view of the measuring device in working position.

FIG. 7 is the bottom view of the measuring device in free state.

FIG. 8 is the bottom view of the measuring device in working position.

FIG. 9 is the front view of the measuring device in free state. This device is furnished with longer outside unit than the length of the inside unit.

FIG. 10 is the same as FIG. 9, but in working position.

The above mentioned measuring device consists of a barrel 1, in which are placed a slide 2, a spring 3, and a guide 4. The ends of barrel 1 are closed by endplates 1A. At center of slide 2 is a hole in horizontal direction and guide 4 is placed into this hole. On both ends of guide 4 are fixed endplates 4A. Spring 3 is located between the left hand end of slide 2 and the endplate 4A of guide 4. The slide 2 is under constant pressure of spring 3 and is movable on guide 4 against spring 3. Slide 2 can be locked to barrel 1 at any point of the slide-way by turn of screw 19. Barrel 1 has four slots: 8, 9, 10 and 11. The measuring device has two opposing measuring glides, one—glide 5—is fixed on barrel 1 and the other—glide 13—is fixed on slide 2. Glide 13 is fastened to slide 2 through slot 8. The free ends of measuring glide 5 and measuring glide 13 serve as measuring point 6 and measuring point 14 of the measuring device. Measuring points 6 and 14 are ground to radius. The constant pressure of spring 3 on slide 2 forces the measuring points to self alignment in the hole to be measured. It is advisable that measuring points 6 and 14 be used for the measuring of small holes, for instance up to 0.250 inch diameter, but for measuring of bigger holes than the above mentioned, measuring points 6 and 14 should be furnished with ring 7 or ball bearing 15 which are capable of revolving around their own axis. When ring 7 or ball bearing 15 are employed, these constitute the measuring points of the measuring device. The friction between the measuring glides of the heretofore known measuring calipers and the edge of the hole to be measured—mentioned in the first paragraph—is, when using this new device completely eliminated through the rotation of ring 7 or ball bearing 15. On slide 2 two pusher plates 16 and 17 are mounted for pushing slide 2 against spring 3 to vary the distance between the left hand face of the measuring point of measuring glide 5 and the right hand face of the measuring point of measuring glide 13. Pusher plate 16 is fastened to slide 2 through slot 9, and pusher plate 17 is fastened to slide 2 through slot 10. Slot 9 and slot 10 serve to the guidance of pusher plates 16 and 17. On top of barrel 1 are fixed true scales 12. On true scale 12 a zero mark 22 is placed. The first line is the zero line and should be in line with the left hand face of the measuring point of measuring glide 5. Through slot 11, on slide 2 a vernier scale 18 is mounted. By moving slide 2 the vernier scale 18 will be moved too. The movement of the latter on top surface of barrel 1 takes place parallel to true scale 12. On vernier scale 18 a zero mark 21 is placed. The first line is the zero line and should be in line with the right hand face of the measuring point of measuring glide 13. The measuring capacity of this measuring device is limitless, the minimum measurable size is determined by the size of the measuring points and the maximum measurable size depends upon the length of the barrel. It is advisable to manufacture these measuring devices in different lengths, while keeping the length of the inside unit (shown in FIG. 1) equal to the inner length of the outside unit (shown in FIG. 2) and seen in FIGS. 3–8. But it is also possible to make the measuring device as it is shown in FIGS. 9 and 10. Namely, barrel 1 can be longer than the length of its inside unit and the entire inside unit can be moved back and forth inside barrel 1 with the help of the pusher plates 16 and 17. By moving the inside unit in the direction of the measuring glide 5 of barrel 1 and fastening it to barrel 1 by using screw 20, the measuring capacity of the device can be decreased. By moving the inside unit in the opposite direction, the measuring capacity of the device can be increased. The inside unit has to be locked in position to barrel 1 with the help of screw 20 before taking any measurements.

This measuring device operates as follows: When said device is applied to a hole, spring 3 forces slide 2 to move, and because of this forced motion of the slide 2, the measuring glides 5 and 13 of the measuring device as well as the vernier scale 18 are also forced to move.

As a result of these mechanically caused movements the measuring points of the measuring glides 5 and 13 are forced into those two oppositely located points of the hole which are the end points of an imaginary straight line cutting through the center of the hole to be measured. When the measuring points are situated in the hole, the vernier scale 18 becomes simultaneously situated with respect to the true scale 12, and accurately shows the results of the measurement.

I claim:

1. A measuring device, comprising a barrel, a slide slideably mounted in said barrel, said barrel being equipped with endplates to maintain the slide within said barrel, said slide having an opening extending therethrough and a guide mounted within said opening with said slide being movable on said guide, said guide being equipped with endplates, a spring mounted on said guide and extending between said slide and one of said guide endplates, said barrel being equipped with a plurality of circumferentially-related slots, a vernier scale external to said barrel and equipped with a portion extending through a first of said slots, said portion being secured to said slide, a setscrew extending through said first slot and fixed to said slide to lock said slide to said barrel, a measuring glide secured to said slide and extending outwardly therefrom through a second of said slots, two pusher plates secured to said slide and extending outwardly therefrom through third and fourth slots of said slots to help in moving said slide on said guide against said spring, said barrel being equipped with a true scale for coaction with said vernier scale, said barrel being equipped with a measuring glide for coaction with the slide measuring glide, with the free ends of the glides being ground to a radius to provide measuring points.

2. The device according to claim 1 in which the free ends of said measuring glides are equipped with rings rotatably mounted thereon to eliminate friction between measuring points and the part to be measured.

3. The device of claim 2 in which said rings are equipped with ball bearings to provide the rotatable ring mounting on said glides.

4. The structure of claim 1 in which one of said guide endplates is equipped with a setscrew extending through one of said slots for locking said guide in selected positions within said barrel.

5. A measuring device, comprising an elongated, hollow body equipped with a plurality of longitudinally-extending, circumferentially spaced-apart slots, a slide slidably mounted in said body and equipped with portions extending laterally therefrom and through said slots, said portions being movable in said slots, one of said portions being equipped with a vernier scale, said body being equipped with a true scale arranged adjacent one of said slots for coaction with said vernier scale, means on said body limiting the movement of said slide therein, means on said slide manually aiding the movement of said slide in said body, said body also being equipped with a laterally-extending measuring glide, the other of said slide portions having a measuring glide for coaction with the body glide in mensuration, said glides having smooth similar arcuate contours on the sides thereof employed in said mensuration, and means in said body urging said slide longitudinally thereof, whereby said glides are urged into contacting relation with opposed portions of the object being measured.

6. The structure of claim 5 in which said slide limiting means include a guide equipped with endplates, a setscrew coupled to one of said endplates and extending through one of said slots for locking said guide in selected positions within said body.

7. A measuring device, comprising an elongated, hollow body equipped with a plurality of longitudinally-extending, circumferentially spaced-apart slots, a slide slidably mounted in said body and equipped with portions extending laterally therefrom and through said slots, said portions being movable in said slots, one of said portions being equipped with a vernier scale, said body being equipped with a true scale arranged adjacent one of said slots for coaction with said vernier scale, means on said body limiting the movement of said slide therein, means on said slide manually aiding the movement of said slide in said body, said body also being equipped with a laterally-extending measuring glide, the other of said slide portions having a measuring glide for coaction with the body glide in mensuration, said glides having smooth similar arcuate contours on the sides thereof employed in said mensuration, and means in said body urging said slide longitudinally thereof, whereby said glides are urged into contacting relation with opposed portions of the object being measured, said glides being equipped with rings rotatable thereon about axes transverse of the length of said body to provide the said arcuate contours of said glides.

8. The structure of claim 7 in which said slide limiting means includes a guide equipped with endplates, a setscrew coupled to one of said endplates and extending through one of said slots for locking said guide in selected positions within said body.

References Cited in the file of this patent

UNITED STATES PATENTS

| | | |
|---|---|---|
| 695,661 | Theibault | Mar. 18, 1902 |
| 1,154,620 | Eitner | Sept. 28, 1915 |
| 1,805,343 | Robbins | May 12, 1931 |
| 2,523,469 | Hubeck | Sept. 26, 1950 |